US011129014B2

(12) United States Patent
Li et al.

(10) Patent No.: US 11,129,014 B2
(45) Date of Patent: Sep. 21, 2021

(54) METHODS AND APPARATUS TO MANAGE INACTIVE ELECTRONIC SUBSCRIBER IDENTITY MODULES

(71) Applicant: Apple Inc., Cupertino, CA (US)

(72) Inventors: Li Li, Los Altos, CA (US); Najeeb M. Abdulrahiman, Fremont, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/808,012

(22) Filed: Mar. 3, 2020

(65) Prior Publication Data

US 2020/0288298 A1 Sep. 10, 2020

Related U.S. Application Data

(60) Provisional application No. 62/815,697, filed on Mar. 8, 2019.

(51) Int. Cl.
| | |
|---|---|
| *H04W 8/18* | (2009.01) |
| *H04W 12/06* | (2021.01) |
| *H04L 29/06* | (2006.01) |
| *H04W 4/60* | (2018.01) |
| *H04W 8/26* | (2009.01) |
| *H04W 12/30* | (2021.01) |

(52) U.S. Cl.
CPC ......... *H04W 8/183* (2013.01); *H04L 63/0853* (2013.01); *H04W 4/60* (2018.02); *H04W 8/26* (2013.01); *H04W 12/06* (2013.01); *H04W 12/35* (2021.01)

(58) Field of Classification Search
CPC ............... H04L 63/0853; H04L 29/06; H04W 12/0023; H04W 12/06; H04W 4/60; H04W 8/183; H04W 8/26; H04W 12/00; H04W 8/18
See application file for complete search history.

(56) References Cited

U.S. PATENT DOCUMENTS

| | | | | |
|---|---|---|---|---|
| 8,385,553 | B1 * | 2/2013 | Jooste | G06Q 20/027 380/277 |
| 8,429,409 | B1 * | 4/2013 | Wall | H04L 9/0894 713/172 |
| 10,425,118 | B2 * | 9/2019 | Yang | H04L 63/08 |
| 10,764,746 | B1 * | 9/2020 | Dreiling | H04W 4/60 |
| 2009/0127328 | A1 * | 5/2009 | Aissa | G06K 9/00885 235/377 |
| 2012/0108204 | A1 * | 5/2012 | Schell | H04W 8/205 455/411 |
| 2012/0260086 | A1 * | 10/2012 | Haggerty | H04W 12/48 713/150 |

(Continued)

*Primary Examiner* — Nathan S Taylor
(74) *Attorney, Agent, or Firm* — Dickinson Wright RLLP

(57) ABSTRACT

The described embodiments set forth techniques for managing inactive (disabled) electronic subscriber identity modules (eSIMs) on secure elements, e.g., Universal Integrated Circuit Cards (UICCs) and/or embedded UICCs (eUICCs), of a wireless device, including retrieving information from an inactive eSIM, obtaining authentication tokens from an inactive eSIM, authenticating the inactive eSIM with a network-based Mobile Network Operator (MNO) server, retrieving status information for a subscription account associated with the inactive eSIM, and/or performing an account management operation on the inactive eSIM.

20 Claims, 12 Drawing Sheets

(56) References Cited

U.S. PATENT DOCUMENTS

| | | | | |
|---|---|---|---|---|
| 2012/0260090 A1* | 10/2012 | Hauck | ................... | H04L 9/32 |
| | | | | 713/168 |
| 2012/0331292 A1* | 12/2012 | Haggerty | ............ | H04L 63/0853 |
| | | | | 713/168 |
| 2013/0205390 A1* | 8/2013 | Hauck | ................ | H04W 12/35 |
| | | | | 726/22 |
| 2013/0210388 A1* | 8/2013 | Li | ................. | H04W 12/1205 |
| | | | | 455/411 |
| 2013/0282502 A1* | 10/2013 | Jooste | ............. | G06Q 20/363 |
| | | | | 705/21 |
| 2014/0073375 A1* | 3/2014 | Li | ..................... | H04W 8/22 |
| | | | | 455/558 |
| 2014/0143826 A1* | 5/2014 | Sharp | ............. | H04W 12/086 |
| | | | | 726/1 |
| 2015/0181433 A1* | 6/2015 | Li | ..................... | H04W 8/22 |
| | | | | 726/4 |
| 2016/0164883 A1* | 6/2016 | Li | ................ | H04W 12/00409 |
| | | | | 726/7 |
| 2016/0239817 A1* | 8/2016 | Chene | ................ | G06Q 20/322 |
| 2016/0277051 A1* | 9/2016 | Yang | ................ | H04L 41/0806 |
| 2016/0277930 A1* | 9/2016 | Li | ..................... | H04W 12/06 |
| 2016/0302070 A1* | 10/2016 | Yang | ............. | H04W 12/00401 |
| 2017/0338962 A1* | 11/2017 | Li | ..................... | H04W 8/18 |
| 2018/0027480 A1* | 1/2018 | Narasimhan | ........ | H04W 48/08 |
| | | | | 455/435.1 |
| 2018/0165673 A1* | 6/2018 | Francis | ................ | G06F 21/74 |
| 2018/0336553 A1* | 11/2018 | Brudnicki | ......... | G06Q 20/3227 |
| 2018/0367992 A1* | 12/2018 | Huber | ............... | H04W 12/06 |
| 2020/0045542 A1* | 2/2020 | Wilson | ............. | H04L 63/0853 |
| 2020/0137566 A1* | 4/2020 | Jin | ..................... | H04W 76/14 |

* cited by examiner

Authentication Command Format

| Code | Value | Comment |
|---|---|---|
| CLA | As Specified in Clause 10.1.1 | |
| INS | As Specified in Clause 10.1.2 | |
| P1 | '00' | |
| P2 | As Specified in Table 11.18 (See Below) | Use Reserved Value to Indicate Authenticate* Command |
| Lc | Length of Subsequent Data Field | |
| Data | Authentication Related Data | Identify eSIM using ICCID before Authentication Data |
| Le | Length of Response Data | |

*FIG. 4A*

Table 11.18: Bit Level Coding of P2

| b8 | b8 | b8 | b8 | b8 | b8 | b8 | b8 | Meaning | Comment |
|---|---|---|---|---|---|---|---|---|---|
| 0 | 0 | 0 | 0 | 0 | 0 | 0 | 0 | No information given | |
| 0 | 0 | 0 | 0 | 0 | 0 | 0 | 0 | Global Reference Data (e.g., MF Specific KEY) | |
| 1 | 1 | 1 | 1 | 1 | 1 | 1 | 1 | Specific Reference Data (e.g., DF Specific/Application Dependent KEY) | |
| - | - | - | - | - | - | - | - | '00' (Other Values RFU) | Allocate Reserved Values for Authentication* and Special Commands |
| - | - | - | - | - | - | - | - | Reference Data Number ('01' to '1F') | |

| Mobile Equipment (ME) 442 | | Secure Element (SE) 110 | eSIM A active<br>eSIM B inactive<br>eSIM C inactive |

| eSIM | STK Logical Channel |
|---|---|
| A (active) | Basic Channel |
| B (inactive) | N/A |
| C (inactive) | N/A |

482 — Start Session (eSIM B identifier, enable_STK=TRUE) →
     ← 9000 + SessionID + Logical Channel Number X for eSIM B STK Events (response)

Handled by SE OS

| eSIM | STK Logical Channel |
|---|---|
| A (active) | Basic Channel |
| B (inactive) | X |
| C (inactive) | N/A |

484 — End Session (SessionID) →
     ← 9000 (response)

Handled by SE OS

| eSIM | STK Logical Channel |
|---|---|
| A (active) | Basic Channel |
| B (inactive) | N/A |
| C (inactive) | N/A |

*FIG. 4E*

METHODS AND APPARATUS TO MANAGE INACTIVE ELECTRONIC SUBSCRIBER IDENTITY MODULES

CROSS-REFERENCE TO RELATED APPLICATIONS

The present application claims the benefit of U.S. Provisional Application No. 62/815,697, entitled "METHODS AND APPARATUS TO MANAGE INACTIVE ELECTRONIC SUBSCRIBER IDENTITY MODULES," filed Mar. 8, 2019, the content of which is incorporated herein by reference in its entirety for all purposes.

FIELD

The described embodiments set forth techniques for managing inactive (disabled) electronic subscriber identity modules (eSIMs) on secure elements, e.g., Universal Integrated Circuit Cards (UICCs) and/or embedded UICCs (eUICCs), of a wireless device, including retrieving information from an inactive eSIM, obtaining authentication tokens from an inactive eSIM, authenticating the inactive eSIM with a network-based Mobile Network Operator (MNO) server, retrieving status information for a subscription account associated with the inactive eSIM, and/or performing an account management operation on the inactive eSIM.

BACKGROUND

Wireless devices include profiles, also referred to as (i) subscriber identity modules (SIMs) for removable universal integrated circuit cards (UICCs) or (ii) electronic SIMs (eSIMs) for embedded UICCs (eUICCs) and for some UICCs that support eSIMs. An active (enabled) profile can be used to access services of a wireless service provider, also referred to as an MNO. When associating with a wireless network, a wireless device performs an authentication key agreement (AKA) procedure to activate a security context and establish a set of security keys for encrypted communication and message integrity verification over a secure channel between the wireless device and the wireless network. The AKA procedure can also be used to authenticate with an MNO-based server to retrieve account status server and to authorize performance of account management actions. Presently, authentication by a wireless device is restricted to an active SIM/eSIM. Newer wireless devices, however, can include a combination of SIMs and eSIMs, where one or more eSIMs can be inactive at any given time. The wireless device can also be restricted to allow only one eSIM to be active at a time. As such, in order to obtain up-to-date account status information or to perform account management operations for multiple eSIMs installed on a secure element, e.g., on an eUICC or UICC, the wireless device can be required to perform multiple activations and deactivations of eSIMs, in order to retrieve serially account status information for each eSIM while activated. This serial activation and deactivation of eSIMs can interfere with normal use of the wireless device, such as when the wireless device is temporarily out-of-service after deactivation of a current eSIM and before activation of a subsequent eSIM. Additionally, access using some eSIMs, such as when roaming internationally, can incur roaming fees in order to retrieve the account status information or to perform the account management actions, which can be viewed negatively by a user of the wireless device.

SUMMARY

The described embodiments set forth techniques for managing inactive (disabled) electronic subscriber identity modules (eSIMs) on secure elements, e.g., Universal Integrated Circuit Cards (UICCs) and/or embedded UICCs (eUICCs), of a wireless device, including retrieving information from an inactive eSIM, obtaining authentication tokens from an inactive eSIM, authenticating the inactive eSIM with a network-based Mobile Network Operator (MNO) server, retrieving status information for a subscription account associated with the inactive eSIM, and/or performing an account management operation on the inactive eSIM.

Wireless devices use authentication tokens and security keys, obtained from SIMs/eSIMs installed on secure elements, e.g., UICCs and/or eUICCs, of the wireless device, to authenticate with a wireless carrier in order to perform certain functions, such as authentication with an entitlement server to access account status or to perform account management actions, as well as to perform an authentication and key agreement (AKA) procedure in order to establish a secure connection with the wireless network. The wireless device can include multiple eSIMs installed on one or more secure elements of the wireless device, e.g., on an eUICC and/or on a UICC of the wireless device, where some of the multiple eSIMs can be in an inactive (disabled) state. Processing circuitry of the wireless device external to the secure element can send a special command, such as an authentication command or an information query command, to the secure element for a particular inactive eSIM and obtain information in response from the inactive eSIM. Information can include an AKA token to use to authenticate with a network-based MNO server and to obtain account status information therefrom or to perform an account management operation therewith. Information obtained from the inactive eSIM can also include an MNO-assigned unique identity associated with the eSIM, such as a mobile station international subscriber directory number (MSISDN) and/or an international mobile subscriber identity (IMSI). Authentication with the MNO server can be accomplished via a data connection (i) through a cellular wireless network associated with an active eSIM of the wireless device or (ii) through a non-cellular wireless network, such as via a Wi-Fi data connection to the MNO server. In some embodiments, the wireless device communicates in parallel with multiple MNO servers associated with respective multiple inactive eSIMs to obtain up-to-date account status information for the multiple inactive eSIMs. In some embodiments, the authentication command or information query command is formatted in accordance with a European Technical Standards Institute (ETSI), Third Generation Partnership Project (3GPP), or Global System for Mobile Communications Association (GSMA) wireless communication standard and includes a bit pattern identifying the authentication command or information query command. In some embodiments, the authentication command or information query command includes a unique identifier to indicate the inactive eSIM from which information is to be obtained. In some embodiments, the authentication command or information query command is communicated via a secure communication channel between the secure element and processing circuitry external to the secure element, where the secure communication channel is also used to communicate with a concurrently active eSIM on the secure element. In some embodiments, the authentication command or information query command is communicated to the inactive eSIM via a secure communication channel between the secure element and processing circuitry external to the secure element, where the secure communication channel is separate from an additional secure communication channel between the secure element and the processing circuitry external to the secure element, where the additional secure communication channel is used to communicate with a concurrently active eSIM on the secure element.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 4A and 4B illustrate an exemplary format for a modified authenticate command to communicate with an inactive eSIM of a wireless device, in accordance with some embodiments.

FIGS. 4C, 4D, 4E, 4F, 4G, and 4H illustrate exemplary flow diagrams for communication between a secure element and processing circuitry of a wireless device external to the secure element to communicate with eSIMs of the wireless device, in accordance with some embodiments.

DETAILED DESCRIPTION

Figure 1:
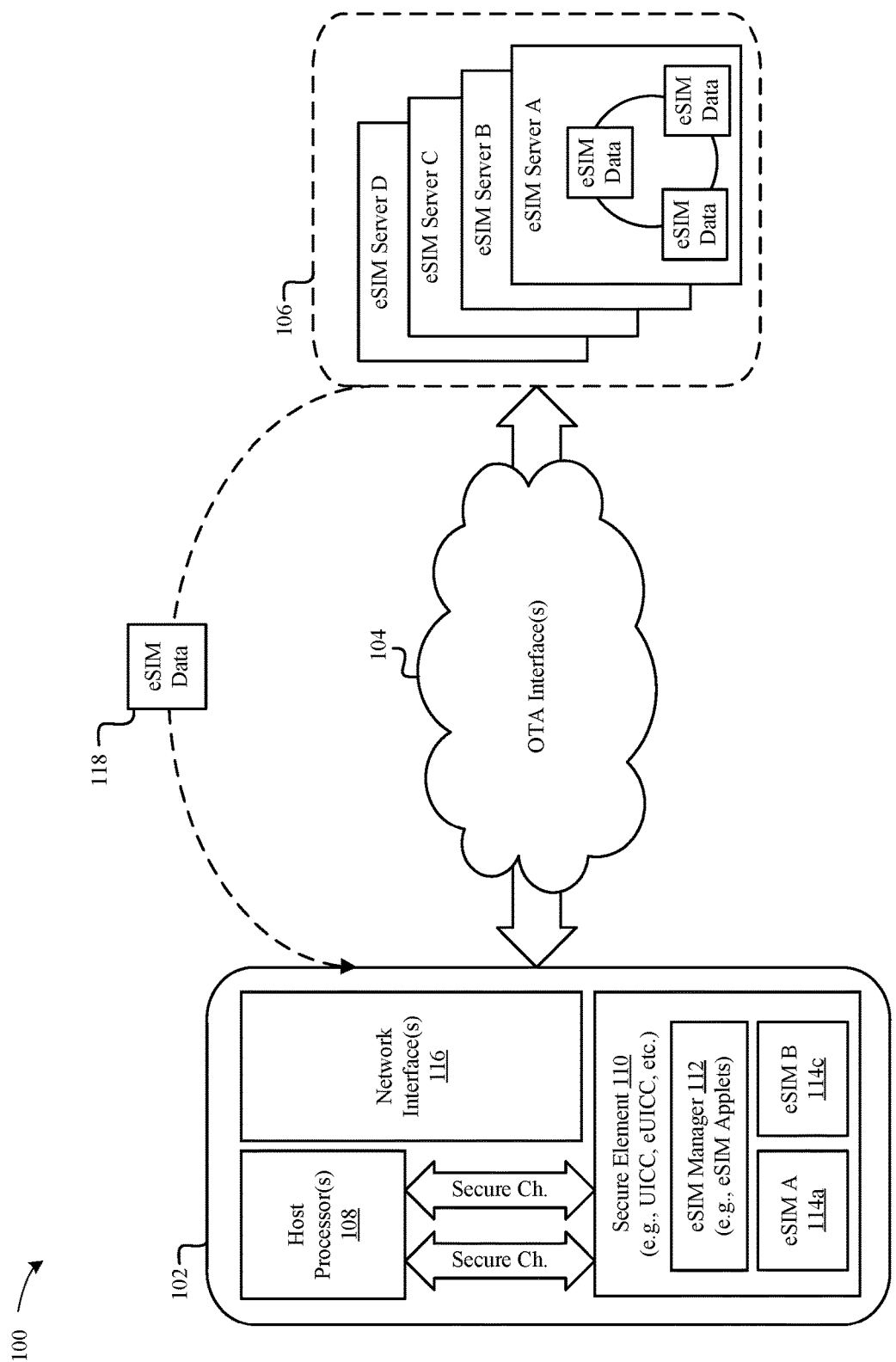
FIG. 1 illustrates an exemplary network diagram of a wireless device and multiple electronic subscriber identity module (eSIM) servers, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the scope of the described embodiments.

Wireless devices can include multiple eSIMs on a secure element, e.g., on an eUICC or a UICC, where one or more eSIMs can be in an inactive (disabled) state. New (or modified versions of current) commands for communicating between the secure element and the processing circuitry external to the secure element can allow for retrieval of information from an inactive eSIM or from a network-based MNO server associated with the inactive eSIM without establishing a cellular wireless connection through a wireless network of an MNO associated with the inactive eSIM. Exemplary network-based MNO servers, from which information can be obtained, include: an entitlement server; an authentication server; an authentication, authorization, and accounting (AAA) server; a home location register (HLR); and/or a home subscriber server (HSS). Processing circuitry of the wireless device external to the secure element can send a special command, such as an authentication command or an information query command, to the secure element for a particular inactive eSIM and obtain information in response from the inactive eSIM. Information obtained from the inactive eSIM can include an authentication token, e.g., an AKA token, to use to authenticate with a network-based MNO server associated with the eSIM and to obtain account status information therefrom and/or to perform an account management operation therewith. The authentication token provided by the inactive eSIM can be based on a device-side key set, e.g., a subscriber key $K_i$ that is known to both the wireless device and the MNO server, and also based on a key derivation function (KDF) known to both. Information obtained from the inactive eSIM by the processing circuitry of the wireless device can also include an MNO-assigned unique identity associated with the eSIM, such as a mobile station international subscriber directory number (MSISDN) and/or an international mobile subscriber identity (IMSI). Authentication with the network-based MNO server can be over a data connection (i) through a cellular wireless network associated with an active eSIM of the wireless device or (ii) through a non-cellular wireless network, such as via a Wi-Fi data connection to the MNO server. In some embodiments, the wireless device communicates in parallel with multiple MNO servers associated with respective multiple inactive eSIMs to obtain up-to-date account status information for the multiple inactive eSIMs. Activation of an inactive eSIM on the secure element is not required to obtain the account status information from an associated MNO server, as the wireless device can use the authentication token obtained from the inactive eSIM to authenticate with the MNO server. The wireless device, in some embodiments, can be restricted to a subset of possible actions, such as for querying the MNO server for account status information or to perform a limited set of account management actions, when authentication with the MNO server uses an authentication token obtained from an inactive eSIM using the authentication command. The authentication token can be restricted to not be usable for attachment to the wireless device to the wireless network associated with the MNO server, as the inactive eSIM will not be used for cellular wireless connections while in the inactive state. In some embodiments, a wireless device can restrict the total number of active eSIMs allowed at any one time, e.g., only one active eSIM or two active eSIMs depending on a hardware configuration of the wireless device. In some embodiments, information for a combination of eSIMs (whether active or inactive) can be obtained from respective network-based MNO servers concurrently in parallel.

As subscription information for an account associated with an inactive eSIM can be maintained and updated at the MNO server, the wireless device can use the authentication token obtained from the inactive eSIM to authenticate with the MNO server and obtain updated information for the associated account. By allowing for limited purpose authentication of an inactive eSIM, the wireless device can maintain up-to-date information for a user's subscription account associated with the inactive eSIM without required user intervention. With this feature in the wireless device, a user (or an operational component of the wireless device) is not required to disable an active eSIM and subsequently enable an inactive eSIM in order to obtain up-to-date account information. Moreover, the wireless device can establish a data connection to the MNO server, when available on an Internet Protocol (IP) network, through a cellular connection of an active eSIM or through a non-cellular connection. The wireless device need not establish a cellular connection through a wireless network associated with the inactive eSIM to retrieve information from the associated MNO server. In some embodiments, the wireless device can establish parallel data connections with multiple MNO servers for a set of inactive eSIMs in order to obtain up-to-date account status information or to perform account management actions. In some embodiments, processing circuitry external to the secure element communicates with one or more inactive eSIMs via a secure channel that is also used for communication with an active eSIM. In some embodiments, a command sent to the inactive eSIM, via the secure channel shared with the active eSIM, includes a unique identifier for the eSIM to indicate to which eSIM the command is intended. In some embodiments, the processing circuitry external to the secure element communicates with an inactive eSIM via a secure channel separately established from another secure channel used to communicate with an active eSIM. With a separate secure channel for the inactive eSIM, commands to the eSIM need not include an identifier, as the separate secure channel can be dedicated to communication with the inactive eSIM. In some embodiments, the processing circuitry external to the secure element accesses a file structure of an inactive eSIM, using one or more commands communicated via the secure channel, to obtain information from the inactive eSIM, such as to retrieve an MSISDN.

In some embodiments, the processing circuitry external to the secure element uses information obtained from one or more inactive eSIMs and/or from one or more associated MNO servers to provide accurate, up-to-date status information for the one or more inactive eSIMs, such as via a display of the wireless device. Exemplary status information can include whether a particular subscription is active or inactive, an amount of data available, an amount of voice call time available, a number of short message service (SMS) messages available, a usage amount for any of data, voice call time, and/or SMS messages. In some embodiments, special commands sent to a secure element can allow for transfer of one or more inactive eSIMs from the wireless device to another wireless device. In some embodiments, a special command communicated to an inactive eSIM can conform to a modified version of a GSMA or ETSI communication protocol. In some embodiments, an authenticate command includes a particular value in a reserved field (or portion thereof) to indicate the authenticate command is for a limited purpose to retrieve information from an inactive eSIM or to authenticate with an associated MNO server from which to retrieve information. In some embodiments, a separate logical channel is opened for each inactive eSIM from which information is to be retrieved, where the separate logical channel is uniquely associated with the inactive eSIM and unmodified commands can be used to communicate with the inactive eSIM, as the secure element's operating system can direct the unmodified commands to the applicable inactive eSIM based on the logical channel over which the unmodified command is communicated.

These and other embodiments are discussed below with reference to FIGS. 1-6; however, those skilled in the art will readily appreciate that the detailed description given herein with respect to these figures is for explanatory purposes only and should not be construed as limiting.

FIG. 1 illustrates an exemplary network diagram 100 of a wireless device 102 capable of communicating with multiple electronic subscriber identity module (eSIM) servers 106 using one or more over-the-air (OTA) interface(s) 104. In some embodiments, the wireless device 102 is also capable of communicating with one or more of the eSIM servers 106 via a combination of wired and wireless connections, such through a combination of a local area network (LAN), wireless local area network (WLAN), metro area network (MAN), and/or wireless wide area network (WWAN) interconnected with an IP network to which the or more eSIM servers 106 are also connected. In some configurations, the Wireless device 102 may include a network interface component 116 that allows the Wireless device 102 to communicate using any common types of 2G, 3G, 4G, or 5G cellular wireless communication technologies, as well as any common types of WLAN, e.g., Wi-Fi, and wireless personal area network (WPAN), e.g., Bluetooth®, communication technologies. In this regard, the OTA interface 104 may correspond to a wireless communication channel between the Wireless device 102 and one or more network base stations (not shown), including the eSIM servers 106.

The wireless device 102 may also include one or more host processor(s) 108 for processing resident application data and IP data for communications with the network interface component 116 via the OTA interface(s) 104. Additionally, the wireless device 102 can include a secure element 110 that, in various embodiments, may correspond to an embedded UICC (eUICC) component. Alternatively, in other configurations, the secure element 110 may correspond to a removable UICC component. In some embodiments, the wireless device can include a combination of UICC and eUICC components. It should be understood that the secure element 110 may include secure processor and secure storage/memory components (not shown) that allow the secure element 110 to operate the eSIM manager 112, e.g., one or more eSIM applet application(s), to maintain/manage one or more provisioned eSIMs 114*a-b*. The eSIMs 114*a-b* stored in the secure element 110 can be initially provisioned to the wireless device 102 by any of the eSIM servers 106.

By way of example, in various embodiments, eSIM server A of the eSIM servers 106 may be associated with a first MNO, and eSIM server B of the eSIM servers 106 may be associated with a second MNO. In one scenario, eSIM server A may provision eSIM A 114a to the wireless device 102 via a first wireless network, and the wireless device 102 may open a secure channel between the host processor(s) 108 and the secure element 110 to store eSIM A 114a within a secure storage of the secure element 110. In accordance with various implementations, the secure channel can be cryptographically secure (using encryption) at the wireless device 102 to prevent access to any eSIM data within the wireless device 102 during provisioning. Likewise, the secure element 110 can be cryptographically secure (using encryption) at the wireless device 102 to prevent access to any data within the secure element 110 by any on-device or remote hardware and/or software entities.

After eSIM A has been provisioned within the secure element 110 of the wireless device 102, eSIM A 114a may be activated by eSIM Server A to enable to wireless device 102 to communicate using the wireless network(s) of the first MNO. Later, such as when the wireless device 102 is roaming, eSIM server B may provision eSIM B 114b to the wireless device 102 via, and the wireless device 102 may open another secure channel between the host processor(s) 108 and the secure element 110 to store eSIM B 114b within the secure storage of the secure element 110. At this time, eSIM A 114a can be active (also referred to as enabled) and eSIM B 114b can be inactive (also referred to as disabled) within the secure element 110 of the wireless device 102, with eSIM A 114a and eSIM B 114b having been respectively provisioned to the wireless device 102 by different MNOs corresponding to eSIM Server A and eSIM Server B.

It should be understood that, in accordance various embodiments, multiple eSIMs 114 of a single MNO may be provisioned to the secure element 110 of the wireless device 102, or alternatively (as described in the above scenario), multiple eSIMs 114 of any number of different MNOs may be provisioned to the secure element 110 of the wireless device 102 via corresponding eSIM servers 106, using any number of secure communication channels. After one or more eSIMs 114a-b have been provisioned to the wireless device 102, one of which can be an active eSIM (e.g., eSIM A 114a) with the other eSIM(s) being inactive (e.g., eSIM B 114b), various active and inactive eSIMs 114 may be maintained and/or managed at the wireless device 102 using the eSIM manager 112. In this regard, the eSIM manager 112 may collaborate with a corresponding eSIM server(s) 106 to update eSIM profile data or to atomically replace one or more inactive eSIMs 114 (collectively referred to as eSIM data 118). This eSIM data 118 can be transferred to the wireless device 102 from the eSIM server(s) 106 via the OTA interface(s) 104, in a cryptographically secure (using encryption) manner, to prevent access to the eSIM data 118 by any unintended third parties.

The wireless device 102 can include multiple secure elements 110, e.g., a UICC that can include a SIM and/or one or more eSIMs 114, and an eUICC that can include one or more eSIMs 114. In some embodiments, the wireless device 102 includes an eUICC and does not include a UICC. In some embodiments, the wireless device 102 includes two or more eSIMs 114 on one or more secure elements 110. Each eSIM 114 of the multiple eSIMs 114 on a secure element 110 of the wireless device 102 can be associated with a corresponding subscription for access to services of an associated mobile network operator (MNO). In some scenarios, responsive to input by a user, the wireless device 102 can provide information regarding one or more subscriptions associated with the multiple eSIMs 114 on the secure element 110 of the wireless device 102. In order to provide accurate, up-to-date information for the subscriptions associated with the multiple eSIMs 114, the wireless device 102 can access information from applicable network-based servers of the MNOs associated with the eSIMs 114. Representative network-based MNO servers can include an entitlement server, an authentication server, an authentication, authorization, and accounting (AAA) server, a home location register (HLR), and/or a home subscriber server (HSS). In order to obtain information for an eSIM 114, such as subscription information and/or account status, from an applicable network-based server of an MNO, the wireless device 102 can be required to authenticate with the network-based MNO server using an authentication token obtained from the eSIM. As described herein, one or more commands can be communicated by external processing circuitry of the wireless device 102 to the secure element 110 to an inactive eSIM to obtain information from a file structure of the inactive eSIM or to obtain the authentication token with which to authenticate with the MNO server.

Figure 2:
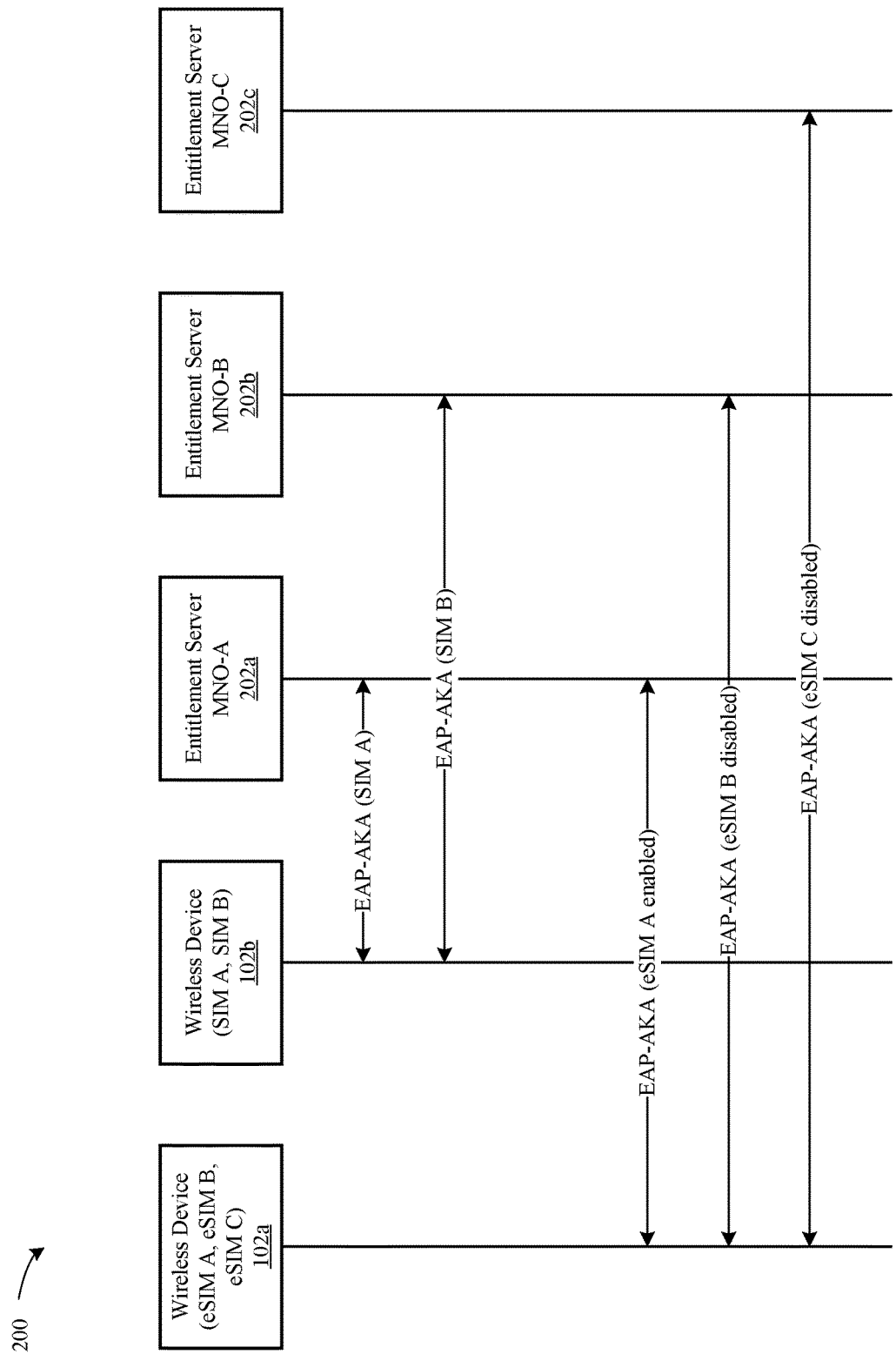
FIG. 2 illustrates a diagram of parallel authentication by a dual subscriber identity module (SIM) wireless device and by a multiple eSIM wireless device, in accordance with some embodiments.

FIG. 2 illustrates a diagram 200 of parallel authentication by a dual SIM wireless device 102b and by a multiple eSIM wireless device 102a with respective network-based MNO entitlement servers 202a-c. The dual SIM wireless device 102b can use an Extensible Authentication Protocol (EAP) Authentication and Key Agreement (AKA) procedure to authenticate with the entitlement server 202a for MNO-A associated with SIM A, where an authentication token and applicable challenges and responses can be obtained from an active SIM A of the dual SIM wireless device 102b. Similarly, the dual SIM wireless device 102 can use an EAP-AKA procedure to authenticate with the entitlement server 202b for MNO-B associated with SIM B, where the authentication token and applicable challenges and response can be obtained from an active SIM B of the dual SIM wireless device 102b. The dual SIM wireless device 102b can establish and maintain parallel data connections to the respective entitlement servers 202a/202b for MNO-A and MNO-B as both SIM A and SIM B can be active at the same time.

The multiple eSIM wireless device 102a can include multiple eSIMs, eSIM A, eSIM B, and eSIM C, of which fewer than all can be active at the same time. As an example, eSIM A can be enabled and active on an eUICC of the multiple eSIM wireless device 102a, while eSIM B and eSIM C can each be disabled and inactive on the eUICC of the multiple eSIM wireless device 102a. The multiple eSIM wireless device 102a can use an EAP-AKA procedure to authenticate with the entitlement server 202a associated with MNO-A similar to that accomplished by the dual SIM wireless device 102b, as the eSIM A can be enabled and active. In addition, processing circuitry of the multiple eSIM wireless device 102a can use special commands to obtain authentication tokens from the inactive eSIMs, eSIM B and eSIM C, in order to establish additional, parallel data connections to respective entitlement servers 202b/202c associated with MNO-B and MNO-C, even though eSIM B and eSIM C are disabled and inactive. Status information for subscriptions associated with eSIM A, eSIM B, and eSIM C can be obtained in parallel from the respective MNO servers 202a/202b/202c.

Figure 3:
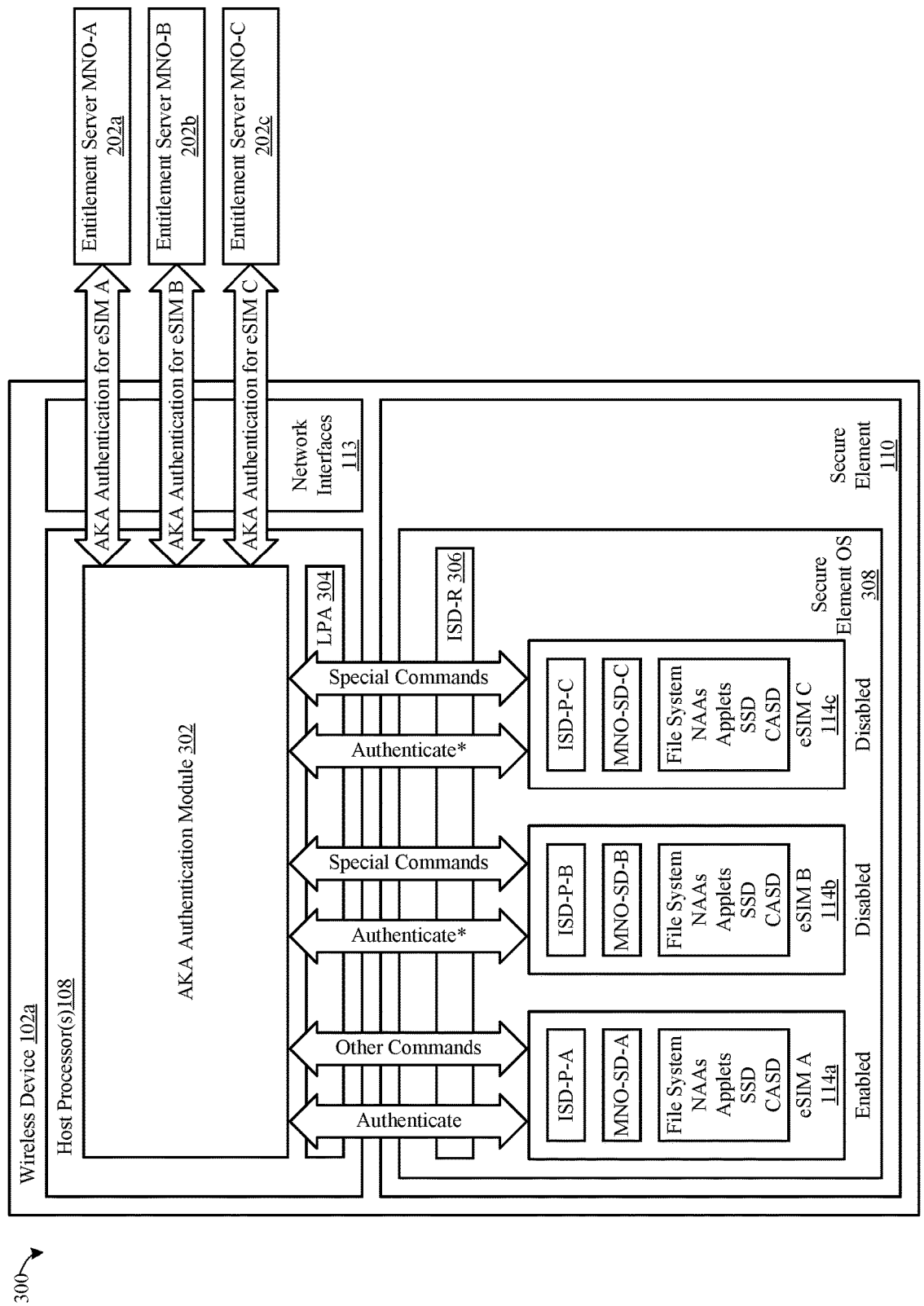
FIG. 3 illustrates a detailed diagram of communication within and external to a multiple eSIM wireless device, in accordance with some embodiments.

FIG. 3 illustrates a detailed diagram 300 of communication within and external to the multiple eSIM wireless device 102a. Processing circuitry of the wireless device 102a can include one or more host processors 108 communicatively coupled to one or more network interfaces 113 for communication off the wireless device 102 and also communicatively coupled internally via one or more secure channels to a secure element 110, e.g., an eUICC or a UICC, of the wireless device 102a. A local profile assistant (LPA) 304 of the external processing circuitry, e.g., within the one or more host processors 108, can establish secure channels with the eSIMs 114 of the secure element 110 through an issuer security domain root (ISD-R) 306. In some embodiments, an AKA authentication module 302 communicates through multiple, parallel secure channels with the eSIMs 114a-c via the LPA 304, ISD-R, and a secure element operating system (OS) 308. In some embodiments, a single secure channel (not shown) can be used for communication between the AKA authentication module 302 and the eSIMs 114a-c, with different eSIMs addressed by inclusion of unique identifiers for the respective eSIMs 114a-c in commands communicated between the AKA authentication module 302 and the eSIMs 114a-c. The AKA authentication module 302 can use an authenticate command (Authenticate) and/or other commands to communicate with enabled eSIM A 114a. The AKA authentication module 302 can also use a modified authenticate command (Authenticate*) and/or special commands to communicate with disabled eSIM B 114b and disabled eSIM C 114c. The disabled eSIMs, eSIM B 114b and eSIM C 114c, can respond to the authenticate command (or the modified authenticate commend) by providing authentication tokens, challenges, and/or responses as needed to allow the AKA authentication module 302 to authenticate with the respective entitlement servers 202b for MNO-B and 202c for MNO-C. Once authenticated, the processing circuitry (e.g., host processor(s) 108) can communicate via the network interfaces 113 with the entitlement servers 202a-c to obtain status information and/or perform other account management functions for subscriptions associated with the eSIMs 114a-c. In some embodiments, communication with a network-based MNO server for a first MNO associated with an inactive eSIM can be through a data connection using a cellular wireless connection established using an active eSIM of the wireless device 102, e.g., via a cellular access network associated with the active eSIM. In some embodiments, the MNO associated with the inactive eSIM can be different from the MNO associated with the active eSIM. In some embodiments, communication with a network-based MNO server can be through a non-cellular data connection, e.g., via a Wi-Fi network.

FIGS. 4A and 4B illustrate tables 400/420 of an exemplary format for a modified authenticate command to communicate with an inactive eSIM 114 of a wireless device 102. One or more reserved values for a P2 field of the authenticate command can be used to indicate a modified authenticate command for communication with an inactive eSIM 114. Additional reserved values for the P2 field can also be used, in some embodiments, to indicate one or more other special commands for access to information from an inactive eSIM 114, such as to retrieve information from a file structure of the inactive eSIM 114. In some embodiments, when the modified authenticate (or other special) command is communicated via a secure channel that is shared with communication to two or more inactive eSIMs 114 and/or with an inactive (or multiple) eSIM 114 and an active eSIM 114, the modified authenticate (or other special) command can include in a Data field an identifier that is unique to the inactive eSIM 114 being addressed, such as an integrated circuit card identifier (ICCID) or an issuer security domain-profile (ISD-P) application identifier (AID) associated with the specific inactive eSIM 114 for which the modified authenticate (or other special) command is intended. In some embodiments, the unique identifier, e.g., the ICCID or the ISD-P AID, can precede authentication data included in the Data field of the modified authentication (or other special) command. In some embodiments, when separate secure channels are opened between the external processing circuitry of the wireless device 102 with the secure element 110, the modified authentication (or other special) command can be addressed to the applicable inactive eSIM 114 based on the specific secure channel used, e.g., when distinct secure channels are opened for each inactive eSIM 114.

Figure 4C:
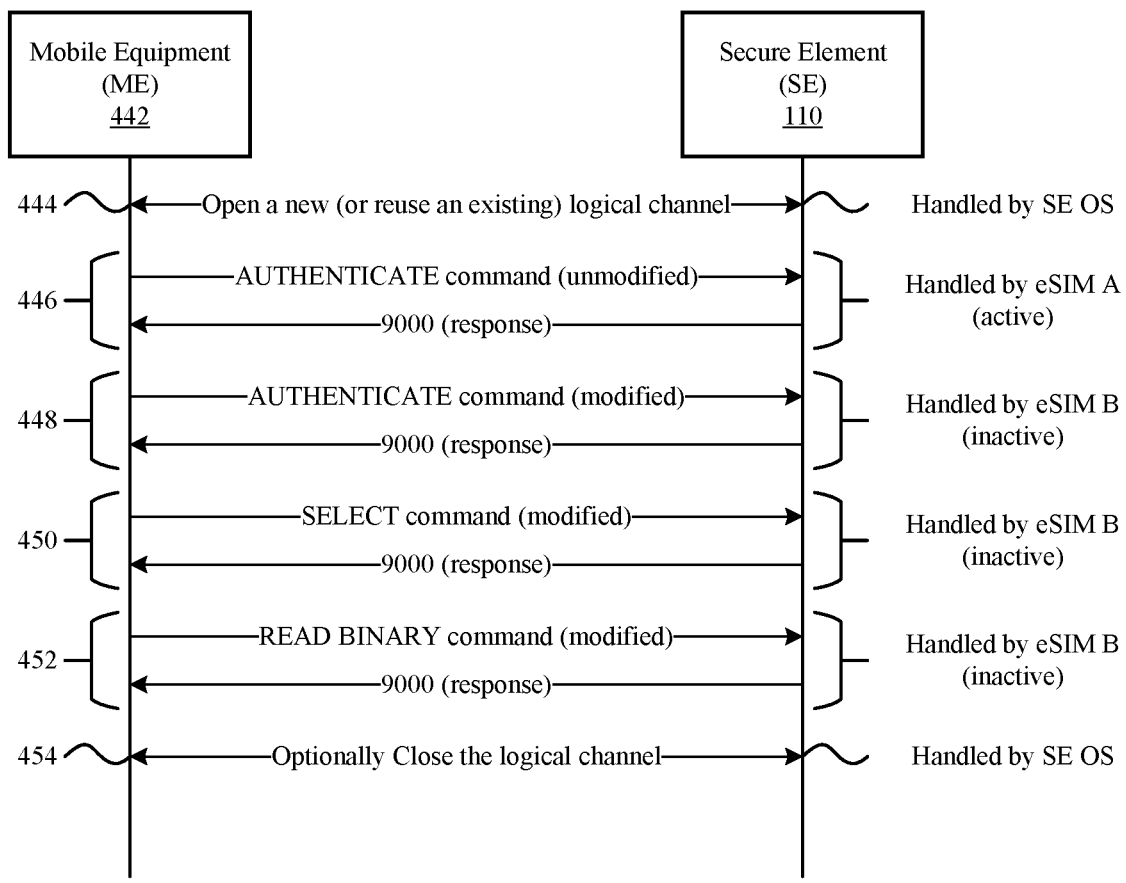

FIG. 4C illustrates an exemplary flow diagram 440 for communication between a secure element (SE) 110 and processing circuitry of a wireless device 102 external to the secure element 110 to communicate with eSIMs of the wireless device 102. The processing circuitry that is external to the secure element 110 and communicates with the secure element 110 can be included as part of (but not necessarily including all of) mobile equipment (ME) of the wireless device 102. The combination of an ME 442 and an SE 110 can be referred to as a user equipment (UE) or a wireless device 102. At 444, the ME 442 opens a new logical channel (or re-uses an existing logical channel) with the secure element 110. Establishment of the new logical channel can be handled at least in part by an operating system (OS) of the SE 110, e.g., SE OS 308 shown in FIG. 3. At 446, the ME 442 sends to the SE 110 an unmodified command, e.g., an unmodified authenticate command, which by default is handled by an active eSIM 114, e.g., active eSIM A, which in turn provides a response (shown as 9000). Commands communicated to the SE 110 by the ME 442 that are unmodified can be assumed by the SE 110 to be intended for the active eSIM 114 (eSIM A). At 448, the ME 442 can send a first modified command, e.g., a modified authenticate command, to the SE 110, where the first modified command includes an identifier for an inactive eSIM 114, e.g., inactive eSIM B, to which the first modified command is intended. The identifier can include an ICCID or an ISD-P AID for the inactive eSIM 114 (eSIM B), which in turn provides a response. The SE OS 308 can determine to which eSIM 114 a modified command is intended based at least in part on the identifier for the eSIM 114 included in the modified command. The identifier can be included as part of the Data field before other authentication data as indicated in FIG. 4A. At 450, the ME 442 can send a second modified command, e.g., a modified select command, to the SE 110, where the second modified command also includes the identifier for the inactive eSIM 114 to which the second modified command is intended, e.g., to inactive eSIM B, which in turn can provide a response. Similarly, at 452, the ME 442 can send a third modified command, e.g., a modified read binary command, to the SE 110, where the third modified command includes an identifier for an inactive eSIM 114, e.g., inactive eSIM B, to which the third modified command is intended, and the SE 110 can provide a response back to the ME 442. Each of the first, second, and third modified commands can be directed to and handled by an inactive eSIM 114, e.g., eSIM B. One or more of the responses from the SE 110 can include information for (or from) the inactive eSIM B, such as an authentication token in response to the modified authenticate command or information extracted from a file structure of the inactive eSIM B, such as an MSISDN or IMSI, in response to the combination of select and read binary commands. At 454, the ME 442 and the SE 110 (e.g., handled by the SE OS 308) can optionally close the logical channel. The communication in FIG. 4C uses unmodified commands to communicate with an active eSIM and modified commands to communicate with an inactive eSIM.

Figure 4D:
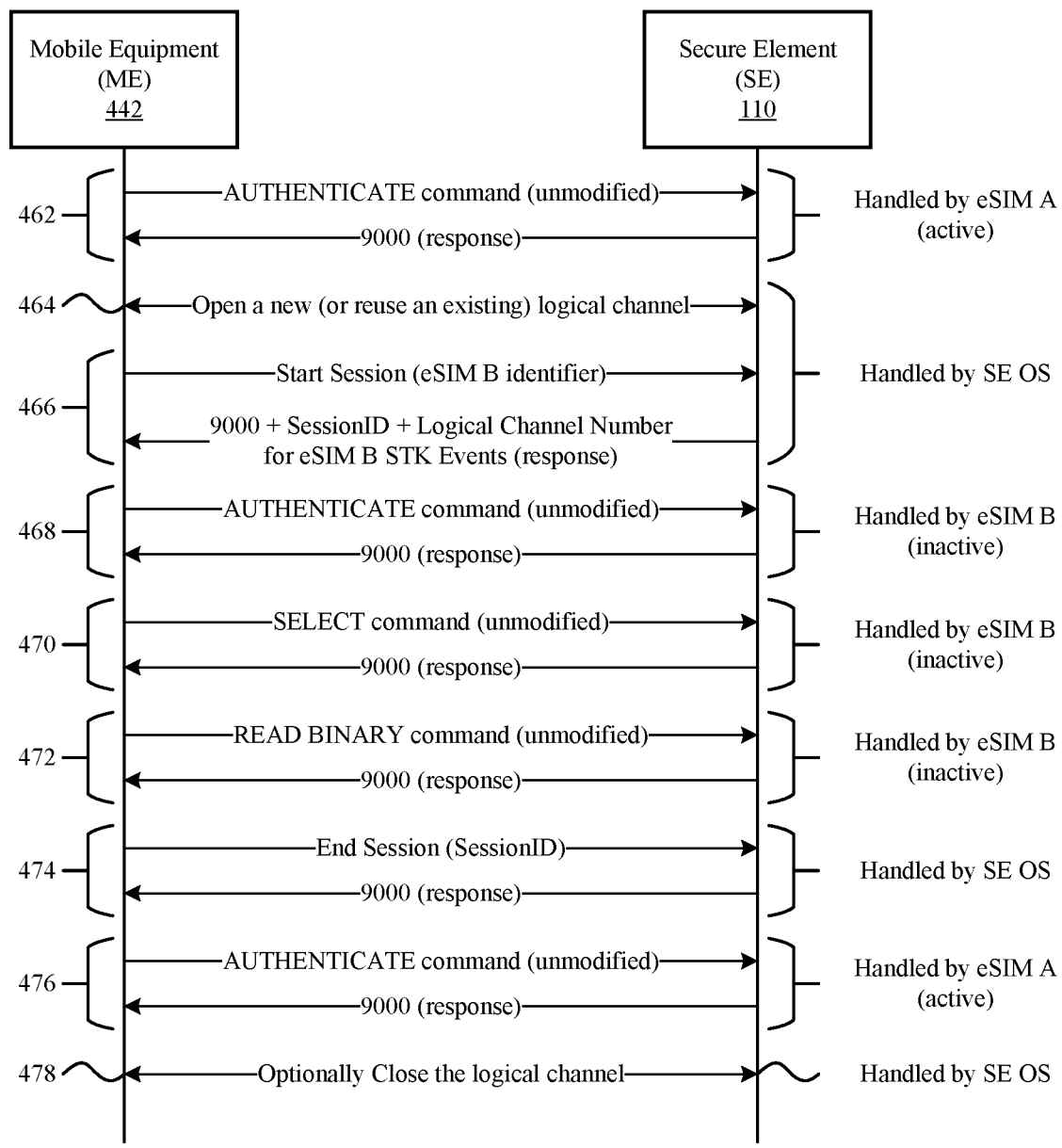

FIG. 4D illustrates another exemplary flow diagram 460 for communication between a secure element 110 and processing circuitry of a wireless device 102 external to the secure element 110 to communicate with eSIMs of the wireless device 102. At 462, the ME 442 sends to the SE 110 an unmodified command, e.g., an unmodified authenticate command, which by default is handled by an active eSIM 114, e.g., active eSIM A, which in turn provides a response. At 464, the ME 442 and SE 110 open a new logical channel (or reuse another existing logical channel). At 466, the ME 442 initiates a new session, e.g., by sending a start session command to the SE 110, where the start session command includes an identifier for an inactive eSIM 114, e.g., inactive eSIM B, for which the session is started and subsequent commands are to be intended (until the session is closed). The start session command indicates to the SE 110 that subsequent commands are targeted for the inactive eSIM 114 identified by the identifier included in the start session command. Representative identifiers for the inactive eSIM 114 include an ICCID or an ISD-P AID for the inactive eSIM 114 (eSIM B). The SE 110 replies to the start session command with a response that includes a session identifier (SessionID) and a logical channel number to use for eSIM B SIM Tool Kit (STK) events. In this scenario, STK events for the active eSIM 114, e.g., eSIM A, can use a first logical channel, while STK events for the inactive eSIM 114, e.g., eSIM B, can use a second logical channel, e.g., the logical channel indicated in the response received from the SE 110. At 468, the ME 442 can send a first unmodified command, e.g., an unmodified authenticate command, to the SE 110, which is directed to the inactive eSIM 114 (eSIM B), which in turn provides a response. The SE OS 308 can determine to which eSIM 114 the first unmodified command is intended based on the most recently established session (e.g., as performed at 466). Unmodified commands received by the SE 110 during the session can be assumed to be targeted to the inactive eSIM 114 identified when starting the session. At 470, the ME 442 can send to the SE 110 a second unmodified command, e.g., an unmodified select command, to which the inactive eSIM 114 (eSIM B) can respond. At 472, the ME 442 can send to the SE 110 a third unmodified command, e.g., an unmodified read binary command, to which the inactive eSIM 114 (eSIM B) can respond. One or more of the responses from the SE 110 can include information for (or from) the inactive eSIM B, such as an authentication token in response to the modified authenticate command or information extracted from a file structure of the inactive eSIM B, such as an MSISDN or IMSI, in response to the combination of select and read binary commands. At 474, the ME 442 can close the current session, e.g., by sending to the SE 110 an end session command that includes an identifier for the session, e.g., SessionID, and the SE 110 can respond to indicate the identified session is closed. Unmodified commands communicated by the ME 442 to the SE 110 after the session is closed, such as the unmodified authenticate command indicated at 476, can be routed to the active eSIM 114, e.g., eSIM A. At 478, the ME 442 and SE 110 can optionally close the logical channel.

While FIGS. 4C and 4D illustrate exemplary communication between an ME 442 and an SE 110 with one active eSIM 114, e.g., eSIM A, and one inactive eSIM 114, e.g., eSIM B, the same ideas can be extended to communication with and management of multiple inactive eSIMs 114 on the SE 110. In some embodiments, multiple modified commands can be communicated from the ME 442 to the SE 110 over a common logical channel to multiple inactive eSIMs 114. Each modified command can include an identifier for a target inactive eSIM 114 on the SE 110 to which the modified command is intended. Inclusion of the identifiers can ensure the SE OS recognizes to which inactive eSIM 114 to direct the modified command. Alternatively, multiple parallel sessions, each with a distinct logical channel, can be opened between the ME 442 and the SE 110 to allow for communication with multiple inactive eSIMs 114, where the SE OS can receive commands for each inactive eSIM 114 over a distinct logical channel.

FIG. 4E illustrates a flow diagram 480 for an exemplary communication between an ME 442 and an SE 110 with one active eSIM 114, e.g., eSIM A, and two inactive eSIMs 114, e.g., eSIM B and eSIM C. Initially, the active eSIM 114, eSIM A, can be associated with a default (basic) SIM tool kit (STK) logical channel, while inactive eSIMs 114, eSIM B and eSIM C, are not associated with any STK logical channels. Communication via the default (basic) logical channel will be interpreted by the SE OS as intended for the active eSIM 114, eSIM A. At 482, the ME 442 sends to the SE 110 a start session command that includes an identifier for an inactive eSIM, e.g., eSIM B. Representative identifiers for the inactive eSIM 114 include an ICCID or an ISD-P AID for the inactive eSIM 114 (eSIM B). The start session command also includes a "TRUE" value for an enable STK field that indicates the SE OS of the SE 110 should assign a new STK logical channel to the identified inactive eSIM 114, i.e., to eSIM B. The SE 110 responds with a session identifier (SessionID) and a logical channel number "X" to be associated with STK events for the inactive eSIM 114 (eSIM B). As a result of the communication at 482, the active eSIM 114, eSIM A, remains associated with a default (basic) STK logical channel, while the inactive eSIM 114, eSIM B, becomes associated with the STK logical channel X, and the inactive eSIM 114, eSIM C, remains not associated with any STK logical channel. At 484, the ME 442 sends to the SE 110 an end session command that includes the session identifier (SessionID), and the SE 110 responds, after which the session for the inactive eSIM B terminates, and the inactive eSIM B returns to a state in which no STK logical channel is associated with the inactive eSIM B.

Figure 4F:
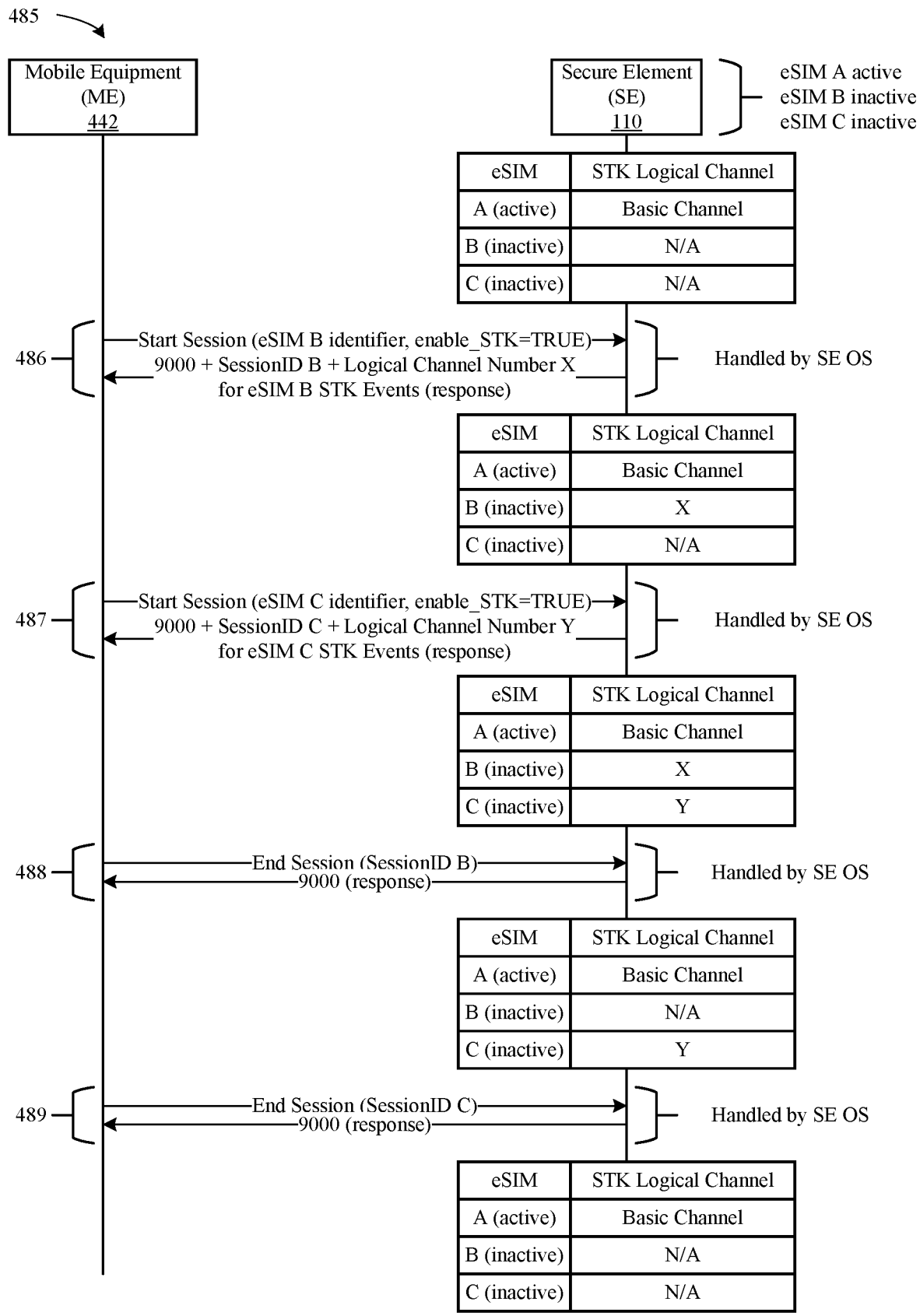

FIG. 4F illustrates a flow diagram 485 for another exemplary communication between an ME 442 and an SE 110 with one active eSIM 114, e.g., eSIM A, and two inactive eSIMs 114, e.g., eSIM B and eSIM C. Initially, the active eSIM 114, eSIM A, is associated with a default (basic) SIM tool kit (STK) logical channel, while inactive eSIMs 114, eSIM B and eSIM C, are not associated with any STK logical channels. Communication via the default (basic) logical channel will be interpreted by the SE OS as intended for the active eSIM 114, eSIM A. At 486, the ME 442 sends to the SE 110 a start session command that includes an identifier for an inactive eSIM, e.g., eSIM B. Representative identifiers for the inactive eSIM 114 include an ICCID or an ISD-P AID for the inactive eSIM 114 (eSIM B). The start session command also includes a "TRUE" value for an enable STK field that indicates the SE OS of the SE 110 should assign a new STK logical channel to the identified inactive eSIM 114, i.e., to eSIM B. The SE 110 responds with a session identifier (SessionID B) and a logical channel number "X" to be associated with STK events for the inactive eSIM 114 (eSIM B). As a result of the communication at 486, the active eSIM 114, eSIM A, remains associated with a default (basic) STK logical channel, while the inactive eSIM 114, eSIM B, becomes associated with the STK logical channel X, and the inactive eSIM 114, eSIM C, remains not associated with any STK logical channel.

At 487, the ME 442 sends to the SE 110 a second start session command that includes a second identifier for another inactive eSIM, e.g., eSIM C. Representative identifiers for the inactive eSIM 114 include an ICCID or an ISD-P AID for the inactive eSIM 114 (eSIM C). The second start session command also includes a "TRUE" value for an enable STK field that indicates the SE OS of the SE 110 should assign a new STK logical channel to the identified inactive eSIM 114, i.e., to eSIM C. The SE 110 responds with a second session identifier (SessionID C) and a second logical channel number "Y" to be associated with STK events for the identified inactive eSIM 114 (eSIM C). As a result of the communication at 487, the active eSIM 114, eSIM A, remains associated with a default (basic) STK logical channel, the inactive eSIM 114, eSIM B, remains associated with the STK logical channel X, and the inactive eSIM 114, eSIM C, becomes associated with the STK logical channel Y. Thus, two sessions, one for each of the identified inactive eSIMs 114, eSIM B and eSIM C, can exist in parallel and be used for communication between the ME 442 and the SE 110. The SE 110 can determine intended communication target eSIMs 114 based on the logical channel used by the ME 442 for communication with the SE 110.

At 488, the ME 442 sends to the SE 110 an end session command that includes the session identifier (SessionID B), and the SE 110 responds, after which the session for the inactive eSIM B terminates, and the inactive eSIM B returns to a state in which no STK logical channel is associated with the inactive eSIM B. The inactive eSIM C remains associated with the STK logical channel Y, while the active eSIM A remains associated with the STK default (basic) logical channel. At 489, the ME 442 sends to the SE 110 a second end session command that includes the second session identifier (SessionID C), and the SE 110 responds, after which the session for the inactive eSIM C terminates, and the inactive eSIM C returns to a state in which no STK logical channel is associated with the inactive eSIM B. The active eSIM A remains associated with the STK default (basic) logical channel.

Figure 4G:
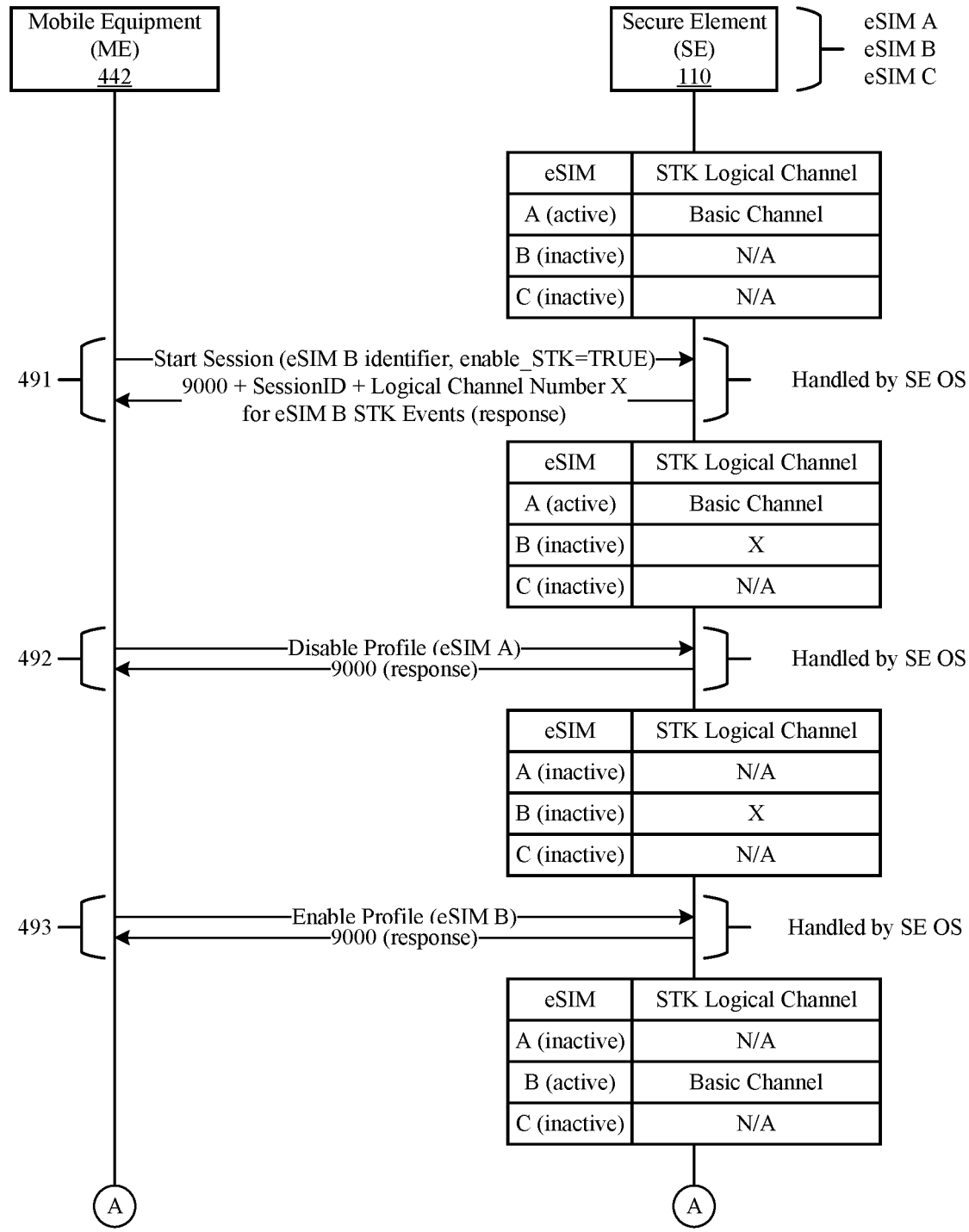
Figure 4H:
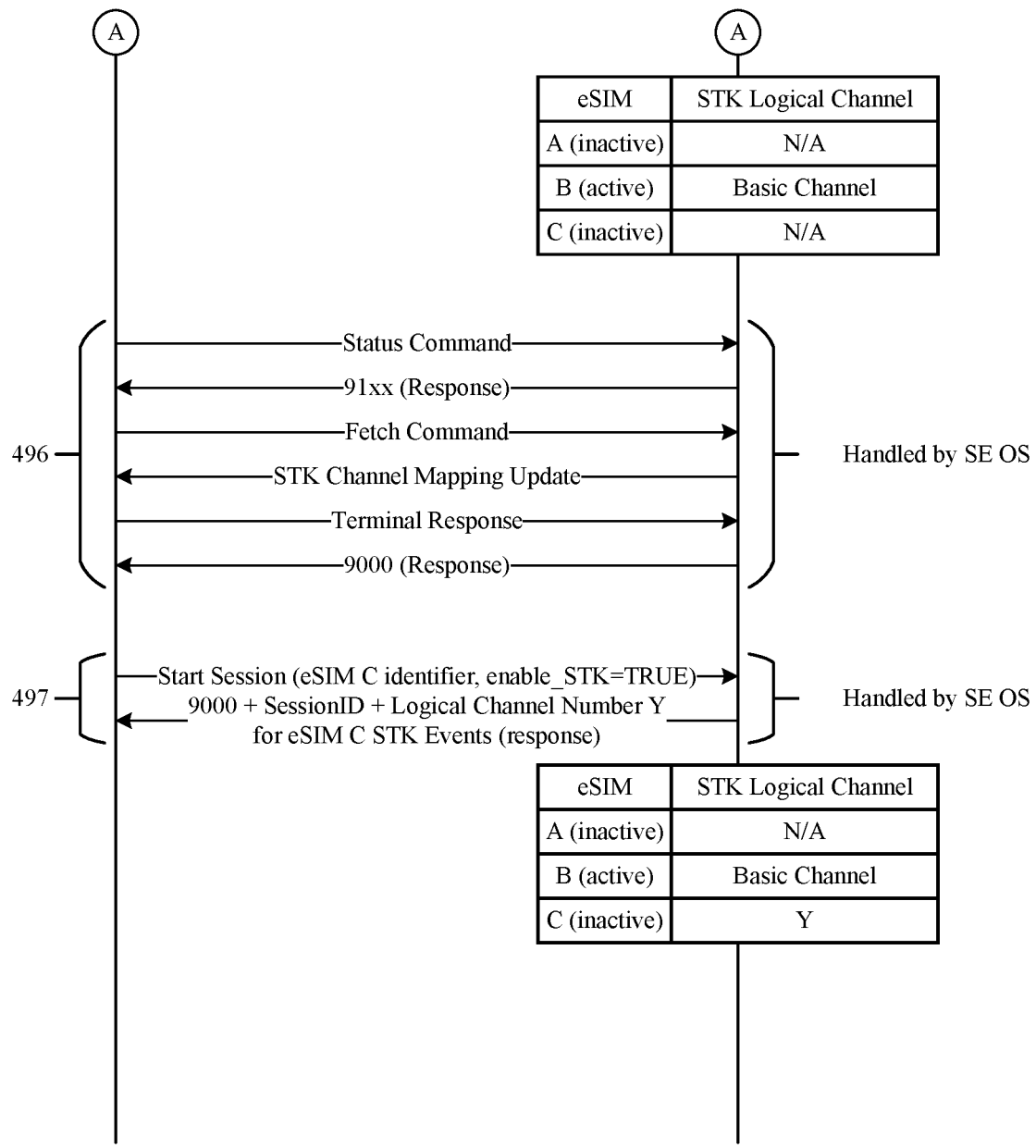

FIGS. 4G and 4H illustrate flow diagrams 490/495 for another exemplary communication between an ME 442 and an SE 110 that includes multiple eSIMs 114. Initially SE 110 includes one active eSIM 114, e.g., eSIM A, and two inactive eSIMs 114, e.g., eSIM B and eSIM C, where the active eSIM 114 is associated with a default (basic) STK logical channel, while the inactive eSIMs 114, eSIM B and eSIM C, are not associated with any STK logical channels. At 491, the ME 442 sends to the SE 110 a start session command that includes an identifier for an inactive eSIM, e.g., eSIM B. Representative identifiers for the inactive eSIM 114 include an ICCID or an ISD-P AID for the inactive eSIM 114 (eSIM B). The start session command also includes a "TRUE" value for an enable STK field that indicates the SE OS of the SE 110 should assign a new STK logical channel to the identified inactive eSIM 114, i.e., to eSIM B. The SE 110 responds with a session identifier (SessionID) and a logical channel number "X" to be associated with STK events for the identified inactive eSIM 114 (eSIM B). As a result of the communication at 482, the active eSIM 114, eSIM A, remains associated with the default (basic) STK logical channel, while the inactive eSIM 114, eSIM B, becomes associated with the STK logical channel X, and the inactive eSIM 114, eSIM C, remains not associated with any STK logical channel.

At 492, the ME 442 sends to the SE 110 a disable profile command directed to the active eSIM 114, e.g., eSIM A, and the SE 110 provides a response. After disabling eSIM A, all three eSIMs 114 of the SE 110, eSIM A, eSIM B, and eSIM C, are in an inactive state. The newly inactive eSIM 114, eSIM A, becomes not associated with any STK logical channel, while inactive eSIM B remains associated with STK logical channel X, and inactive eSIM C remains not associated with any STK logical channel.

At 493, the ME 442 sends to the SE 110 an enable profile command directed to inactive eSIM B, and the SE 110 provides a response. The newly active eSIM B automatically becomes associated with the default (basic) STK logical channel as a result of becoming an active eSIM on the SE 110, while the inactive eSIMs A and C remain not associated with any STK logical channels. The session and logical channel X previously associated with eSIM B (while in the inactive state) are terminated as a result of activation of eSIM B. At 496, a series of commands and responses are communicated between the ME 442 and the SE 110. The SE 110 automatically moved the newly active eSIM B to be associated with the default (basic) STK logical channel and indicates the updated STK channel mapping to the ME 442 via proactive commands.

At 497, the ME 442 sends to the SE 110 a second start session command that includes an identifier for an inactive eSIM, e.g., eSIM C. Representative identifiers for the inactive eSIM 114 include an ICCID or an ISD-P AID for the inactive eSIM 114 (eSIM C). The second start session command also includes a "TRUE" value for an enable STK field that indicates the SE OS of the SE 110 should assign a new STK logical channel to the identified inactive eSIM 114, i.e., to eSIM C. The SE 110 responds with a session identifier (SessionID) and a second logical channel number "Y" to be associated with STK events for the identified inactive eSIM 114 (eSIM C). As a result of the communication at 487, inactive eSIM C becomes associated with the STK logical channel Y, while active eSIM B remains associated with the default (basic) STK logical channel, and inactive eSIM A remains not associated with any STK logical channel.

Figure 5:
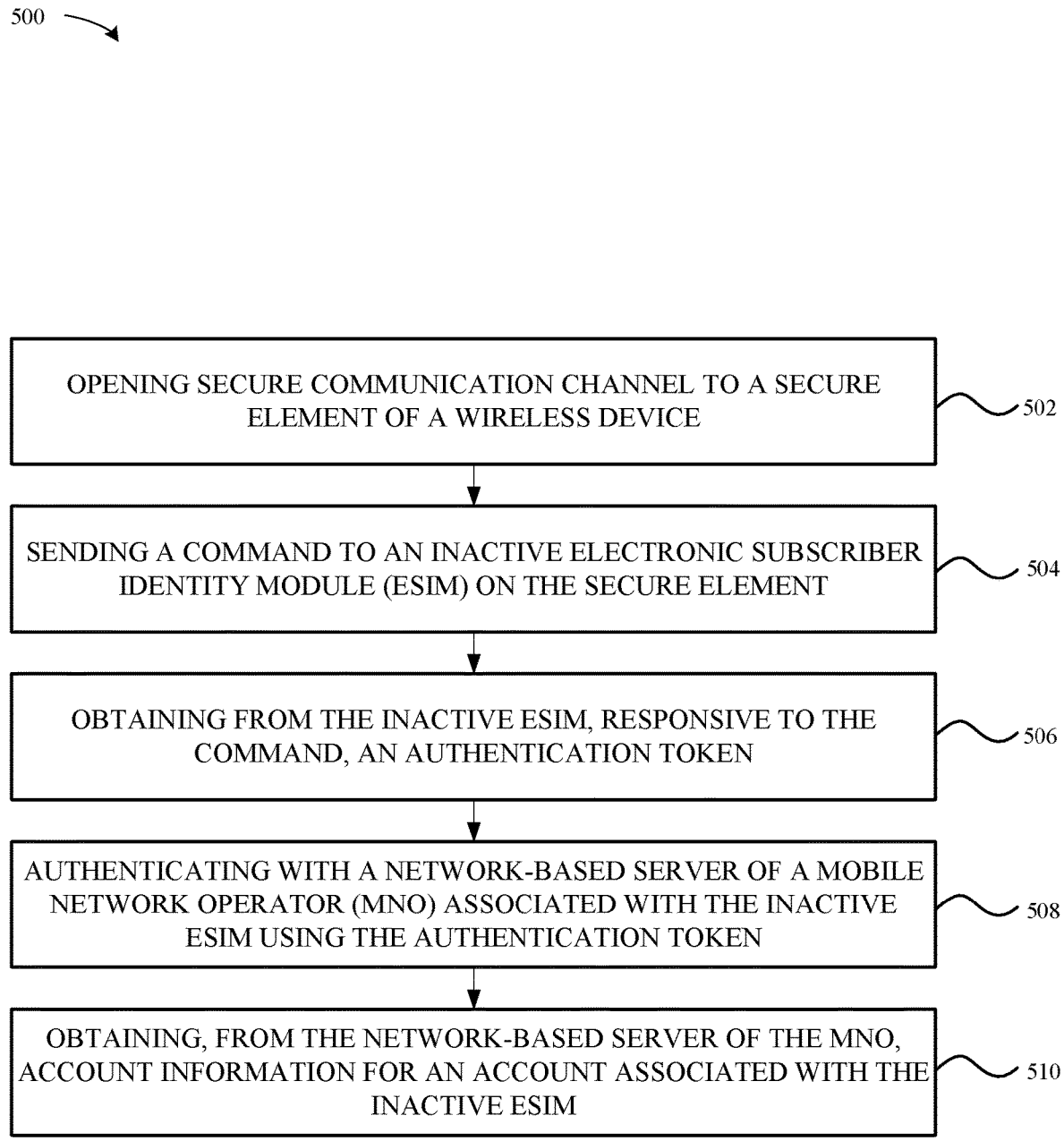
FIG. 5 illustrates a flowchart of an exemplary method for authentication and information retrieval for an inactive eSIM of a wireless device, in accordance with some embodiments.

FIG. 5 illustrates a flowchart 500 of an exemplary method for managing an inactive eSIM 114 on a secure element 110 of a wireless device 102. At 502, processing circuitry of the wireless device 102 external to the secure element 110 opens a secure communication channel to the secure element 110. In some embodiments, the secure communication channel is also used for communicating with an active eSIM 114 on the secure element 110. In some embodiments, the command includes a unique identifier associated with the inactive eSIM 114 to indicate to which eSIM 114 the command is addressed. In some embodiments, the unique identifier associated with the inactive eSIM 114 includes an integrated circuit card identifier (ICCID) or an issuer security domain-profile (ISD-P) application identifier (AID). In some embodiments, the secure communication channel is dedicated for communication with the inactive eSIM 114 and is not used for communication with an active eSIM 114 on the secure element 110. At 504, the processing circuitry of the wireless device 102 external to the secure element 110, e.g., host processor(s) 108, sends a command to the inactive eSIM 114. In some embodiments, the command sent to the inactive eSIM 114 includes a modified authenticate command. At 506, the processing circuitry of the wireless device 102 external to the secure element 110 obtains from the inactive eSIM 114, responsive to the command, an authentication token. In some embodiments, the authentication token is usable for establishing communication with a network-based server of an MNO associated with the inactive eSIM 114, e.g., with an entitlement server 202. In some embodiments, the authentication token is not usable for establishing a connection via a cellular access network of the MNO associated with the inactive eSIM 114. At 508, the processing circuitry of the wireless device 102 external to the secure element 110 authenticates with a network-based server of an MNO associated with the inactive eSIM 114 using the authentication token, e.g., with an entitlement server 202. In some embodiments, the network-based server includes an entitlement server 202, an authentication server, an authentication, authorization, and accounting (AAA) server, a home location register (HLR), and/or a home subscriber server (HSS). At 510, the processing circuitry of the wireless device 102 external to the secure element 110 obtains, from the network-based server of the MNO, account information for an account associated with the inactive eSIM 114. In some embodiments, the account information includes up-to-date account status information for the account associated with the inactive eSIM 114. In some embodiments, the processing circuitry of the wireless device 102 external to the secure element 110 obtains the account information for the inactive eSIM 114 from the network-based server of the MNO via a cellular wireless network associated with an active eSIM 114 of the wireless device 102. In some embodiments, the processing circuitry of the wireless device 102 external to the secure element 110 obtains the account information for the inactive eSIM 114 from the network-based server of the MNO via a non-cellular wireless network data connection to the MNO server.

In some embodiments, the method further includes the processing circuitry of the wireless device 102 external to the secure element 110 sending a second command to the inactive eSIM 114 to obtain an MNO-assigned unique identity associated with the inactive eSIM 114. In some embodiments, the MNO-assigned unique identity includes a mobile station international subscriber directory number (MSISDN) and/or an international mobile subscriber identity (IMSI). In some embodiments, the method further includes the processing circuitry of the wireless device 102 external to the secure element 110 sending a third command to the inactive eSIM 114 to access information contained in a file structure of the inactive eSIM 114 and subsequently retrieving the information from the inactive eSIM 114.

In some embodiments, the method further includes the processing circuitry of the wireless device 102 external to the secure element 110: (a) opening a second secure communication channel to the secure element 110; (b) sending a second command to a second inactive eSIM 114 on the secure element 110; (c) obtaining from the second inactive eSIM 114, responsive to the command, a second authentication token; (d) authenticating with a second network-based server of a second mobile network operator (MNO) associated with the second inactive eSIM 114 using the second authentication token; and (e) obtaining, from the second network-based server of the second MNO, second account information for a second account associated with the second inactive eSIM 114, where account information for the inactive eSIM 114 and second account information for the second inactive eSIM 114 are obtained via parallel, concurrent data connections.

Figure 6:
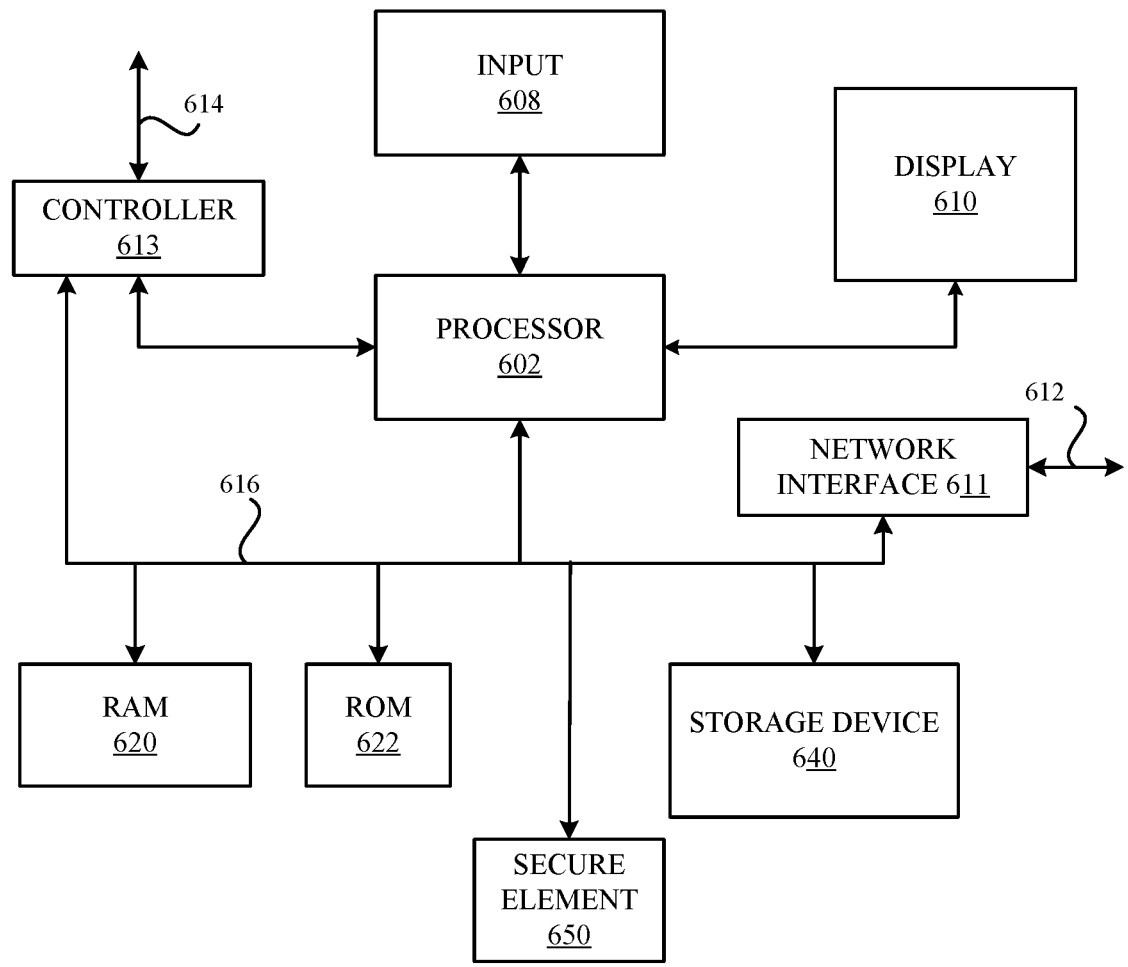
FIG. 6 illustrates a detailed view of a representative computing device that can be used to implement various methods described herein, in accordance with some embodiments.

FIG. 6 illustrates a detailed view of a representative computing device 600 that can be used to implement various methods described herein, according to some embodiments. In particular, the detailed view illustrates various components that can be included in the wireless device 102 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 can further include a secure element (SE) 650, which can represent secure element 110 (e.g., an eUICC or a UICC) of the wireless device 102.

Representative Embodiments

In some embodiments, a method for managing one or more inactive electronic subscriber identity modules (eSIMs) on a secure element of a wireless device includes processing circuitry of the wireless device external to the secure element: i) opening a secure communication channel to the secure element; ii) sending a command to an inactive eSIM of the one or more inactive eSIMs on the secure element; iii) obtaining from the inactive eSIM, responsive to the command, an authentication token; iv) authenticating with a network-based server of a mobile network operator (MNO) associated with the inactive eSIM using the authentication token; and v) obtaining, from the network-based server of the MNO, account information for an account associated with the inactive eSIM.

In some embodiments, the processing circuitry of the wireless device external to the secure element obtains, from the network-based server of the MNO, the account information for the account associated with the inactive eSIM via a cellular wireless network associated with an active eSIM of the wireless device. In some embodiments, the processing circuitry of the wireless device external to the secure element obtains, from the network-based server of the MNO, the account information for the account associated with the inactive eSIM via a non-cellular wireless network data connection to the network-based server of the MNO. In some embodiments, the command sent to the inactive eSIM includes a modified authenticate command. In some embodiments, the secure communication channel is also used for communicating with an active eSIM on the secure element; and the command includes a unique identifier associated with the inactive eSIM to indicate to which inactive eSIM of the one or more inactive eSIMs the command is addressed. In some embodiments, the unique identifier associated with the inactive eSIM includes an integrated circuit card identifier (ICCID) or an issuer security domain-profile (ISD-P) application identifier (AID). In some embodiments, the secure communication channel is dedicated for communication with the inactive eSIM and is not used for communication with an active eSIM on the secure element. In some embodiments, the method further includes the processing circuitry of the wireless device external to the secure element sending a second command to the inactive eSIM to obtain an MNO-assigned unique identity associated with the inactive eSIM. In some embodiments, the MNO-assigned unique identity includes a mobile station international subscriber directory number (MSISDN) or an international mobile subscriber identity (IMSI). In some embodiments, the method further includes the processing circuitry of the wireless device external to the secure element: sending a third command to the inactive eSIM to access information contained in a file structure of the inactive eSIM; and retrieving the information from the inactive eSIM. In some embodiments, the method further includes the processing circuitry of the wireless device external to the secure element: vi) opening a second secure communication channel to the secure element; vii) sending a second command to a second inactive eSIM of the one or more inactive eSIMs on the secure element; viii) obtaining from the second inactive eSIM, responsive to the command, a second authentication token; ix) authenticating with a second network-based server of a second mobile network operator (MNO) associated with the second inactive eSIM using the second authentication token; and x) obtaining, from the second network-based server of the second MNO, second account information for a second account associated with the second inactive eSIM, where the account information for the inactive eSIM and the second account information for the second inactive eSIM are obtained via parallel, concurrent data connections. In some embodiments, the method further includes the processing circuitry of the wireless device external to the secure element presenting, via a display of the wireless device, up-to-date account status information for the account associated with the inactive eSIM based at least in part on the account information obtained from the network-based server of the MNO.

In some embodiments, an apparatus configurable for operation in a wireless device includes processing circuitry of the wireless device external to a secure element of the wireless device, the processing circuitry includes one or more processors communicatively coupled to memory storing instructions that, when executed by the one or more processors, cause the processing circuitry to perform actions including: i) opening a secure communication channel to the secure element; ii) sending a command to an inactive electronic subscriber identity module (eSIM) of one or more inactive eSIMs on the secure element; iii) obtaining from the inactive eSIM, responsive to the command, an authentication token; iv) authenticating with a network-based server of a mobile network operator (MNO) associated with the inactive eSIM using the authentication token; and v) obtaining, from the network-based server of the MNO, account information for an account associated with the inactive eSIM.

In some embodiments, the processing circuitry of the wireless device external to the secure element obtains, from the network-based server of the MNO, the account information for the account associated with the inactive eSIM via a cellular wireless network associated with an active eSIM of the wireless device. In some embodiments, the processing circuitry of the wireless device external to the secure element obtains, from the network-based server of the MNO, the account information for the account associated with the inactive eSIM via a non-cellular wireless network data connection to the network-based server of the MNO. In some embodiments, the command sent to the inactive eSIM includes a modified authenticate command. In some embodiments, the secure communication channel is also used for communicating with an active eSIM on the secure element, and the command includes a unique identifier associated with the inactive eSIM to indicate to which inactive eSIM of the one or more inactive eSIMs the command is addressed. In some embodiments, the unique identifier associated with the inactive eSIM includes an integrated circuit card identifier (ICCID) or an issuer security domain-profile (ISD-P) application identifier (AID). In some embodiments, the secure communication channel is dedicated for communication with the inactive eSIM and is not used for communication with an active eSIM on the secure element. In some embodiments, the actions performed by the processing circuitry of the wireless device external to the secure element further include sending a second command to the inactive eSIM to obtain an MNO-assigned unique identity associated with the inactive eSIM. In some embodiments, the MNO-assigned unique identity includes a mobile station international subscriber directory number (MSISDN) or an international mobile subscriber identity (IMSI). In some embodiments, the actions performed by the processing circuitry of the wireless device external to the secure element further include: sending a third command to the inactive eSIM to access information contained in a file structure of the inactive eSIM; and retrieving the information from the inactive eSIM. In some embodiments, the actions performed by the processing circuitry of the wireless device external to the secure element further include: vi) opening a second secure communication channel to the secure element; vii) sending a second command to a second inactive eSIM of the one or more inactive eSIMs on the secure element; viii) obtaining from the second inactive eSIM, responsive to the command, a second authentication token; ix) authenticating with a second network-based server of a second mobile network operator (MNO) associated with the second inactive eSIM using the second authentication token; and x) obtaining, from the second network-based server of the second MNO, second account information for a second account associated with the second inactive eSIM, where the account information for the inactive eSIM and the second account information for the second inactive eSIM are obtained via parallel, concurrent data connections. In some embodiments, the actions performed by the processing circuitry of the wireless device external to the secure element further include presenting, via a display of the wireless device, up-to-date account status information for the account associated with the inactive eSIM based at least in part on the account information obtained from the network-based server of the MNO.

In some embodiments, a wireless device includes: one or more antennas; a secure element; and processing circuitry, communicatively coupled to the one or more antennas and to the secure element, the processing circuitry including one or more processors communicatively coupled to memory storing instructions that, when executed by the one or more processors, cause the processing circuitry to perform actions including: i) opening a secure communication channel to the secure element; ii) sending a command to an inactive electronic subscriber identity module (eSIM) on the secure element; iii) obtaining from the inactive eSIM, responsive to the command, an authentication token; iv) authenticating with a network-based server of a mobile network operator (MNO) associated with the inactive eSIM using the authentication token; and v) obtaining, from the network-based server of the MNO, account information for an account associated with the inactive eSIM.

In some embodiments, a method for managing one or more inactive electronic subscriber identity modules (eSIMs) on a secure element of a wireless device includes processing circuitry of the wireless device external to the secure element: i) opening a secure communication channel to the secure element; ii) sending a command to an inactive eSIM of the one or more inactive eSIMs on the secure element; iii) obtaining from the inactive eSIM, responsive to the command, an authentication token; iv) authenticating with a network-based server of a mobile network operator (MNO) associated with the inactive eSIM using the authentication token; and v) using the authentication token to perform one or more account management operations for the inactive eSIM in conjunction with the network-based server of the MNO.

In some embodiments, an apparatus configurable for operation in a wireless device includes processing circuitry of the wireless device external to a secure element of the wireless device, the processing circuitry including one or more processors communicatively coupled to memory storing instructions that, when executed by the one or more processors, cause the processing circuitry to perform actions including: i) opening a secure communication channel to the secure element; ii) sending a command to an inactive eSIM of the one or more inactive eSIMs on the secure element; iii) obtaining from the inactive eSIM, responsive to the command, an authentication token; iv) authenticating with a network-based server of a mobile network operator (MNO) associated with the inactive eSIM using the authentication token; and v) using the authentication token to perform one or more account management operations for the inactive eSIM in conjunction with the network-based server of the MNO.

In some embodiments, a wireless device includes one or more antennas; a secure element; and processing circuitry, communicatively coupled to the one or more antennas and to the secure element, the processing circuitry including one or more processors communicatively coupled to memory storing instructions that, when executed by the one or more processors, cause the processing circuitry to perform actions including: i) opening a secure communication channel to the secure element; ii) sending a command to an inactive eSIM of the one or more inactive eSIMs on the secure element; iii) obtaining from the inactive eSIM, responsive to the command, an authentication token; iv) authenticating with a network-based server of a mobile network operator (MNO) associated with the inactive eSIM using the authentication token; and v) using the authentication token to perform one or more account management operations for the inactive eSIM in conjunction with the network-based server of the MNO.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing one or more inactive electronic subscriber identity modules (eSIMs) on a secure element of a wireless device, the method comprising:
    by processing circuitry of the wireless device external to the secure element:
        opening, via an operating system of the secure element, a secure communication channel to the secure element;
        sending, via the secure communication channel, a command to an inactive eSIM of the one or more inactive eSIMs on the secure element;
        obtaining, via the secure communication channel, from the inactive eSIM, responsive to the command, an authentication token;
        authenticating with a network-based server of a mobile network operator (MNO) associated with the inactive eSIM using the authentication token; and
        obtaining, from the network-based server of the MNO, account information for an account associated with the inactive eSIM,
        wherein the secure communication channel is dedicated for communication with the inactive eSIM and is not used for communication with an active eSIM on the secure element.

2. The method of claim 1, wherein the processing circuitry of the wireless device external to the secure element obtains, from the network-based server of the MNO, the account information for the account associated with the inactive eSIM via a cellular wireless network associated with an active eSIM of the wireless device.

3. The method of claim 1, wherein the processing circuitry of the wireless device external to the secure element obtains, from the network-based server of the MNO, the account information for the account associated with the inactive eSIM via a non-cellular wireless network data connection to the network-based server of the MNO.

4. The method of claim 1, wherein the command sent to the inactive eSIM comprises a modified authenticate command.

5. The method of claim 1, further comprising:
    by the processing circuitry of the wireless device external to the secure element:
        sending, via the secure communication channel, a second command to the inactive eSIM to obtain an MNO-assigned unique identity associated with the inactive eSIM.

6. The method of claim 5, wherein the MNO-assigned unique identity comprises a mobile station international subscriber directory number (MSISDN) or an international mobile subscriber identity (IMSI).

7. The method of claim 1, further comprising:
    by the processing circuitry of the wireless device external to the secure element:
        sending, via the secure communication channel, a third command to the inactive eSIM to access information contained in a file structure of the inactive eSIM; and
        retrieving, via the secure communication channel, the information from the inactive eSIM.

8. The method of claim 1, further comprising:
    by the processing circuitry of the wireless device external to the secure element:
        opening, via the operating system of the secure element, a second secure communication channel to the secure element;
        sending, via the second secure communication channel, a second command to a second inactive eSIM of the one or more inactive eSIMs on the secure element;
        obtaining, via the second secure communication channel, from the second inactive eSIM, responsive to the command, a second authentication token;
        authenticating with a second network-based server of a second mobile network operator (MNO) associated with the second inactive eSIM using the second authentication token; and
        obtaining, from the second network-based server of the second MNO, second account information for a second account associated with the second inactive eSIM,
        wherein the account information for the inactive eSIM and the second account information for the second inactive eSIM are obtained via parallel, concurrent data connections.

9. The method of claim 1, further comprising:
    by the processing circuitry of the wireless device external to the secure element:
        presenting, via a display of the wireless device, up-to-date account status information for the account associated with the inactive eSIM based at least in part on the account information obtained from the network-based server of the MNO.

10. An apparatus configurable for operation in a wireless device, the apparatus comprising:
    processing circuitry of the wireless device external to a secure element of the wireless device, the processing circuitry comprising one or more processors communicatively coupled to memory storing instructions that, when executed by the one or more processors, cause the processing circuitry to perform actions including:
        opening, via an operating system of the secure element, a secure communication channel to the secure element;
        sending, via the secure communication channel, a command to an inactive electronic subscriber identity module (eSIM) of one or more inactive eSIMs on the secure element;
        obtaining, via the secure communication channel, from the inactive eSIM, responsive to the command, an authentication token;
        authenticating with a network-based server of a mobile network operator (MNO) associated with the inactive eSIM using the authentication token; and
        obtaining, from the network-based server of the MNO, account information for an account associated with the inactive eSIM, wherein the secure communication channel is dedicated for communication with the inactive eSIM and is not used for communication with an active eSIM on the secure element.

11. The apparatus of claim 10, wherein the processing circuitry of the wireless device external to the secure element obtains, from the network-based server of the MNO, the account information for the account associated with the inactive eSIM via a cellular wireless network associated with an active eSIM of the wireless device.

12. The apparatus of claim 10, wherein the processing circuitry of the wireless device external to the secure element obtains, from the network-based server of the MNO, the account information for the account associated with the inactive eSIM via a non-cellular wireless network data connection to the network-based server of the MNO.

13. The apparatus of claim 10, wherein the actions performed by the processing circuitry of the wireless device external to the secure element further comprise:
sending, via the secure communication channel, a second command to the inactive eSIM to obtain an MNO-assigned unique identity associated with the inactive eSIM.

14. The apparatus of claim 10, wherein the actions performed by the processing circuitry of the wireless device external to the secure element further comprise:
opening, via the operating system of the secure element, a second secure communication channel to the secure element;
sending, via the second secure communication channel, a second command to a second inactive eSIM of the one or more inactive eSIMs on the secure element;
obtaining, via the second secure communication channel, from the second inactive eSIM, responsive to the command, a second authentication token;
authenticating with a second network-based server of a second mobile network operator (MNO) associated with the second inactive eSIM using the second authentication token; and
obtaining, from the second network-based server of the second MNO, second account information for a second account associated with the second inactive eSIM,
wherein the account information for the account associated with the inactive eSIM and the second account information for the second account associated with the second inactive eSIM are obtained via parallel, concurrent data connections.

15. A wireless device comprising:
one or more antennas;
a secure element; and
processing circuitry, communicatively coupled to the one or more antennas and to the secure element, the processing circuitry comprising one or more processors communicatively coupled to memory storing instructions that, when executed by the one or more processors, cause the processing circuitry to perform actions including:
opening, via an operating system of the secure element, a secure communication channel to the secure element;
sending, via the secure communication channel, a command to an inactive electronic subscriber identity module (eSIM) on the secure element;
obtaining, via the secure communication channel, from the inactive eSIM, responsive to the command, an authentication token;
authenticating with a network-based server of a mobile network operator (MNO) associated with the inactive eSIM using the authentication token; and
using the authentication token to perform one or more account management operations for the inactive eSIM in conjunction with the network-based server of the MNO, including obtaining, from the network-based server of the MNO, account information for an account associated with the inactive eSIM via a non-cellular wireless network data connection to the network-based server of the MNO.

16. The wireless device of claim 15, wherein:
the secure communication channel is also used for communicating with an active eSIM on the secure element; and
the command includes a unique identifier associated with the inactive eSIM to indicate to which inactive eSIM of the one or more inactive eSIMs the command is addressed.

17. The wireless device of claim 15, wherein the secure communication channel is dedicated for communication with the inactive eSIM and is not used for communication with an active eSIM on the secure element.

18. The wireless device of claim 15, wherein the command sent to the inactive eSIM comprises a modified authenticate command.

19. The wireless device of claim 15, wherein execution of the instructions further causes the processing circuitry to send, via the secure communication channel, a second command to the inactive eSIM to obtain an MNO-assigned unique identity associated with the inactive eSIM.

20. The wireless device of claim 15, wherein execution of the instructions further causes the processing circuitry to:
send, via the secure communication channel, a third command to the inactive eSIM to access information contained in a file structure of the inactive eSIM; and
retrieve, via the secure communication channel, the information from the inactive eSIM.

* * * * *